(12) United States Patent
Magyar et al.

(10) Patent No.: US 12,523,218 B2
(45) Date of Patent: *Jan. 13, 2026

(54) SYSTEMS AND METHODS FOR WIRELESS CONTROL OF A PUMP MOTOR

(71) Applicant: Regal Beloit America, Inc., Beloit, WI (US)

(72) Inventors: Justin Michael Magyar, Troy, OH (US); Mazen Mohamad Khattab, Dayton, OH (US); Thomas Michael Fink, Tipp City, OH (US); Nathan E. Snell, Tipp City, OH (US); Erik Bartel Nordquist, Tipp City, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/677,774

(22) Filed: Feb. 22, 2022

(65) Prior Publication Data

US 2022/0268283 A1 Aug. 25, 2022

Related U.S. Application Data

(60) Provisional application No. 63/153,514, filed on Feb. 25, 2021.

(51) Int. Cl.
*F04B 49/06* (2006.01)
*E04H 4/12* (2006.01)
(Continued)

(52) U.S. Cl.
CPC ......... *F04B 49/065* (2013.01); *E04H 4/1245* (2013.01); *F04D 15/00* (2013.01);
(Continued)

(58) Field of Classification Search
CPC ...... F04B 49/065; E04H 4/1245; F04D 15/00; F04D 15/0077; F04D 29/426;
(Continued)

(56) References Cited

U.S. PATENT DOCUMENTS 9,285,790 B2 3/2016 Pruchniewski et al.
9,825,565 B2 11/2017 Sullivan et al.
(Continued)

FOREIGN PATENT DOCUMENTS

DE 9415935 U1 11/1994
EP 1452739 A1 9/2004
(Continued)

*Primary Examiner* — Mohammad Ali
*Assistant Examiner* — Sheela Rao
(74) *Attorney, Agent, or Firm* — Armstrong Teasdale LLP

(57) ABSTRACT

A control system for a pump motor includes a first portion disposed outside a housing of the pump motor. The first portion may include a wireless communication interface and a processor. In some embodiments, the processor of the first portion is configured to control the wireless communication interface to receive a user input from a user device, and generate a control signal in response to receiving the user input. The control system also includes a second portion physically separate from the first portion and communicatively coupled to the first portion. The second portion may include a processor configured to receive the control signal from the first portion, and control the pump motor in response to receiving the control signal.

17 Claims, 8 Drawing Sheets

(51) Int. Cl.
*F04D 15/00* (2006.01)
*G05B 15/02* (2006.01)
*G08C 17/02* (2006.01)
*H04W 4/80* (2018.01)

(52) U.S. Cl.
CPC ......... *F04D 15/0077* (2013.01); *G05B 15/02* (2013.01); *G08C 17/02* (2013.01); *H04W 4/80* (2018.02)

(58) Field of Classification Search
CPC ..... F04D 13/0686; G05B 15/02; G08C 17/02; H04W 4/80; H02K 7/14; H02K 11/30; H02K 11/33; H02K 11/35
See application file for complete search history.

(56) References Cited

U.S. PATENT DOCUMENTS

| | | | |
|---|---|---|---|
| 10,030,647 B2 | 7/2018 | Ortiz et al. | |
| 10,840,777 B2 | 11/2020 | Coonrod | |
| 11,000,449 B2 | 5/2021 | Potucek et al. | |
| 2008/0054088 A1 | 3/2008 | Hanke et al. | |
| 2013/0315752 A1 | 11/2013 | Blaser | |
| 2015/0323911 A1* | 11/2015 | Guzelgunler | H02P 1/02 318/478 |
| 2017/0021523 A1* | 1/2017 | Haney | B27B 17/12 |
| 2018/0335038 A1 | 11/2018 | Vestergaard Kragelund et al. | |
| 2021/0164477 A1* | 6/2021 | Stiles, Jr. | F04D 15/0077 |
| 2022/0123677 A1 | 4/2022 | Kokubo et al. | |
| 2022/0136510 A1 | 5/2022 | Pelletier | |
| 2024/0377027 A1* | 11/2024 | Molla | F16N 29/04 |

FOREIGN PATENT DOCUMENTS

EP 2450574 A1 5/2012
EP 3404267 A1 11/2018

* cited by examiner

SYSTEMS AND METHODS FOR WIRELESS CONTROL OF A PUMP MOTOR

CROSS-REFERENCE TO RELATED APPLICATIONS

This application claims the benefit of, and priority to, U.S. Provisional Patent Application Ser. No. 63/153,514, filed Feb. 25, 2021, and entitled "SYSTEMS AND METHODS FOR WIRELESS CONTROL OF A PUMP MOTOR," the contents and disclosure of which are hereby incorporated by reference in their entirety.

BACKGROUND

The field of the disclosure relates generally to a fluid moving system and, more specifically, a pool or spa pump system configured for wireless communication with a user device and including physically separated control boards.

Pool and spa pumps are used to circulate water within a variety of pool types, such as swimming pools, spas, hot tubs, fountains, and the like. The circulation of the water disperses chemicals added to the water to provide for acceptable water conditions. The circulation also permits the passage of water through a filter to remove impurities from the water. Typically, these pumps may operate for a portion of the week, such as on a preselected schedule, or as a single speed motor.

Some pump systems have electronic controllers located adjacent the electric motors, such as mounted within a wall box. These electronic controllers regulate the operation of the pool pump and may be programmed to control the on and off times of the electric motor. They may also control the speed of the pump if the electric motor has more than one possible speed.

BRIEF DESCRIPTION

In one aspect, a control system for a pump motor is described. The control system includes a first portion disposed outside a housing of the pump motor. The first portion may include a wireless communication interface and a processor. In some embodiments, the processor of the first portion is configured to control the wireless communication interface to receive a user input from a user device, and generate a control signal in response to receiving the user input. The control system also includes a second portion disposed inside the housing of the pump motor and communicatively coupled to the first portion. The second portion may include a processor configured to receive the control signal from the first portion, and control the pump motor in response to receiving the control signal.

In another aspect, a pump motor is described. The pump motor includes a housing and a control system for controlling the pump motor. In the example embodiment, the control system includes a first control board disposed outside a housing of the pump motor. The first control board may include a wireless communication interface and a processor. In some embodiments, the processor of the first control board is configured to control the wireless communication interface to receive a user input from a user device, and generate a control signal in response to receiving the user input. The control system also includes a second control board disposed inside the housing of the pump motor and communicatively coupled to the first control board. The second control board may include a processor configured to receive the control signal from the first control board, and control the pump motor in response to receiving the control signal.

In yet another aspect, a method for controlling a pump motor is described. The method includes receiving, by a first control board of a control system, a wireless communication from a user device. In the example embodiment, the wireless communication includes a user input, and at least a portion of the first control board is disposed outside a housing of the pump motor. The method also includes, in at least some embodiments, generating, by the first control board, a control signal in response to receiving the user input, and providing, by the first control board, the control signal to a second control board of the control system. In at least some embodiments, at least a portion of the second control board is disposed within the housing of the pump motor. In addition, the method includes receiving, by the second control board of the control system, the control signal from the first control board, and controlling, by the second control board, the pump motor in response to receiving the control signal.

In yet another aspect, a control system for controlling a pump motor is provided. The control system includes a wireless communication interface and at least one processor coupled in communication with the wireless communication interface. The control system at least partially disposed within a housing of the pump motor. The at least one processor is configured to control the wireless communication interface to receive a user input from a user device, generate a control signal in response to receiving the user input, and control the pump motor in response to the control signal.

In yet another aspect, a pump motor is provided. The pump motor includes a housing and a control system for controlling the pump motor. The control system includes a wireless communication interface and at least one processor coupled in communication with the wireless communication interface. The control system is at least partially disposed within the housing. The at least one processor is configured to control the wireless communication interface to receive a user input from a user device, generate a control signal in response to receiving the user input, and control the pump motor in response to the control signal.

In yet another aspect, a method for controlling a pump motor is provided. The method includes receiving, by a control system at least partially disposed within a housing of the pump motor, a wireless communication from a user device, wherein the wireless communication includes a user input. The method further includes generating, by the control system, a control signal in response to receiving the user input. The method further includes controlling, by the control system, the pump motor in response to the control signal.

DETAILED DESCRIPTION

Embodiments of the pump system described herein include a control system separated into a first control board (e.g., an "application board") and a second control board (e.g., a "drive board"). In the example embodiment, the first control board is enclosed in a top box, which may be coupled to an exterior portion of the pump system, such as an exterior of a pump motor. The second control board may be contained within a motor housing and communicatively coupled via a wired and/or wireless connection to the first control board. In operation, the first control board can wirelessly communicate with a user device, such as a smartphone or tablet computing device, that a user may interface with to provide the user input. In the example embodiment, the first control board processes the user input to generate one or more system-level commands for controlling operation of the motor, such as "stop," "go," and/or "status" commands. Advantageously, the first control board may be replaced or swapped out of the control system without replacement of the second control board contained within the motor housing.

Additionally, embodiments of the pump system described herein provide further benefits such as, for example: (a) providing a control system physically separated into a first control board and a second control board; (b) providing the first control board within a top box, which may be coupled to an exterior of the pump system, such as an exterior of a motor of the pump system; (c) providing the second control board within the motor housing for added security and protection of the second control board; (d) facilitating, by the first control board, wireless communication with a user device, where the user device may receive user input commands; (e) facilitating receiving the user input by the first control board from the user device; (f) wireless communication between the user device and the first control board in any of a variety of wireless communication protocols, such as BLUETOOTH, WiFi, RF, NFC, narrow band IOT, 5G, and/or any other wireless protocol; and (g) translation of the user input by the first control board to one or more system-level control signals for driving or controlling the pump, such as "go," "stop," and/or "status" commands.

Figure 1:
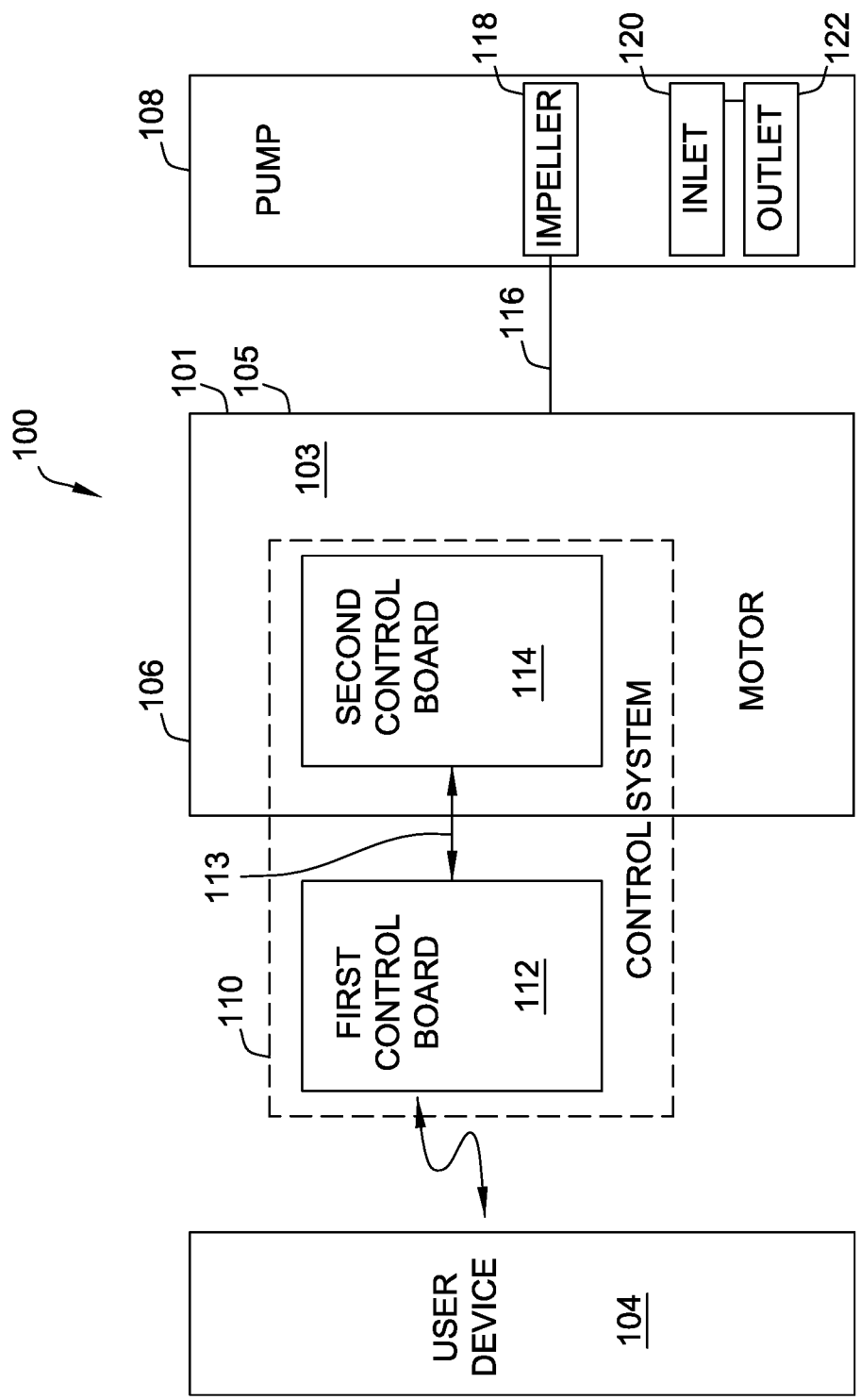
FIG. 1 is a block diagram illustrating an example embodiment of a pump system having a control system including a first control board and a second control board.

FIG. 1 is a block diagram illustrating an example embodiment of a pump system 100. In the example embodiment, pump system 100 includes a user device 104, a motor 106, and a pump 108.

Motor 106 is any of a variety of suitable electric motors, such as an electric variable speed motor. In the example embodiment, motor 106 includes a control system 110 for controlling the operation of motor 106, such as a speed of motor 106, on and/or off times of motor 106, and the like.

In addition, motor 106 includes a housing 101 defining an interior region 103 and having an exterior surface 105. Other components, such as a rotor, a stator, a commutator, and the like may be included, but are not central to an understanding of the present disclosure and are not therefore described in additional detail.

Control system 110 may include a first control board 112 ("first control portion" or "application board"), and a second control board 114 ("second control portion" or "drive board"), each of which are shown and described in additional detail with reference to FIG. 2 below. Generally, first control board 112 and second control board 114 may include any suitable printed circuit board (PCB) or printed circuit board assembly (PCBA), such as any PCB mounted with various hardware components, including, for example, processors, integrated circuits, memory devices, resistors, capacitors, inductors, transformers, and/or any other such hardware.

In some embodiments, first control board 112 and second control board 114 include a combination of hardware and/or software, the latter of which may be stored as computer-executable instructions within one or more memory devices of control boards 110 and/or 112. Moreover, in some implementations, first control board 112 may be configured to perform a variety of input-level processing, such as providing a graphical user interface, receiving user input from the user interface, translating user input into system-level commands, such as "go" or activation commands, "stop" or deactivation commands, and status commands. Hence, first control board 112 may be referred to as an "application board." Similarly, second control board 114 may be configured to perform a variety of system-level processing, such as receiving system level commands from first control board 112, providing control signals to pump 108 in response to receiving commands from first control board 112 and/or driving pump 108, performing safety and status checks, and the like. Hence, second control board 112 may be referred to as a "drive board." As described herein, first control board 112 may be communicatively coupled to second control board 114 by a system or control bus 113, and/or any other suitable wired and/or wireless communications channel.

In the example embodiment, user device 104 may include any suitable computing device capable of providing control instructions, such as wirelessly or via a wireless communications channel, to control system 110. For instance, in at least some implementations, user device 104 includes a tablet computing device, a smartphone, or any other suitable personal computing device. Similarly, control system 110 may be capable of any of a variety of wireless communications protocols, such as BLUETOOTH communications, WiFi communications, near field communications (NFC), radio frequency (RF) communications, narrow band internet of things (TOT), such as a wireless 5G signal (e.g., in range of approximately 30 GHz to 100 GHz), and/or any other suitable communications protocol.

Pump 108 is mechanically coupled to motor 106 by a drive shaft 116, which rotates an impeller 118 of pump 108 to draw fluid (e.g., water) in through a fluid inlet 120. Within pump 108, a variety of filtration and chemical treatment processes may be performed. For example, water drawn in through inlet 120 may be passed through a filter and/or exposed to one or more chemical compounds (e.g., Chlorine). Following filtration and treatment, the fluid is expelled from pump 108 by way of an outlet 122 for recirculation in the original fluid body (e.g., the swimming pool or spa).

Figure 2:
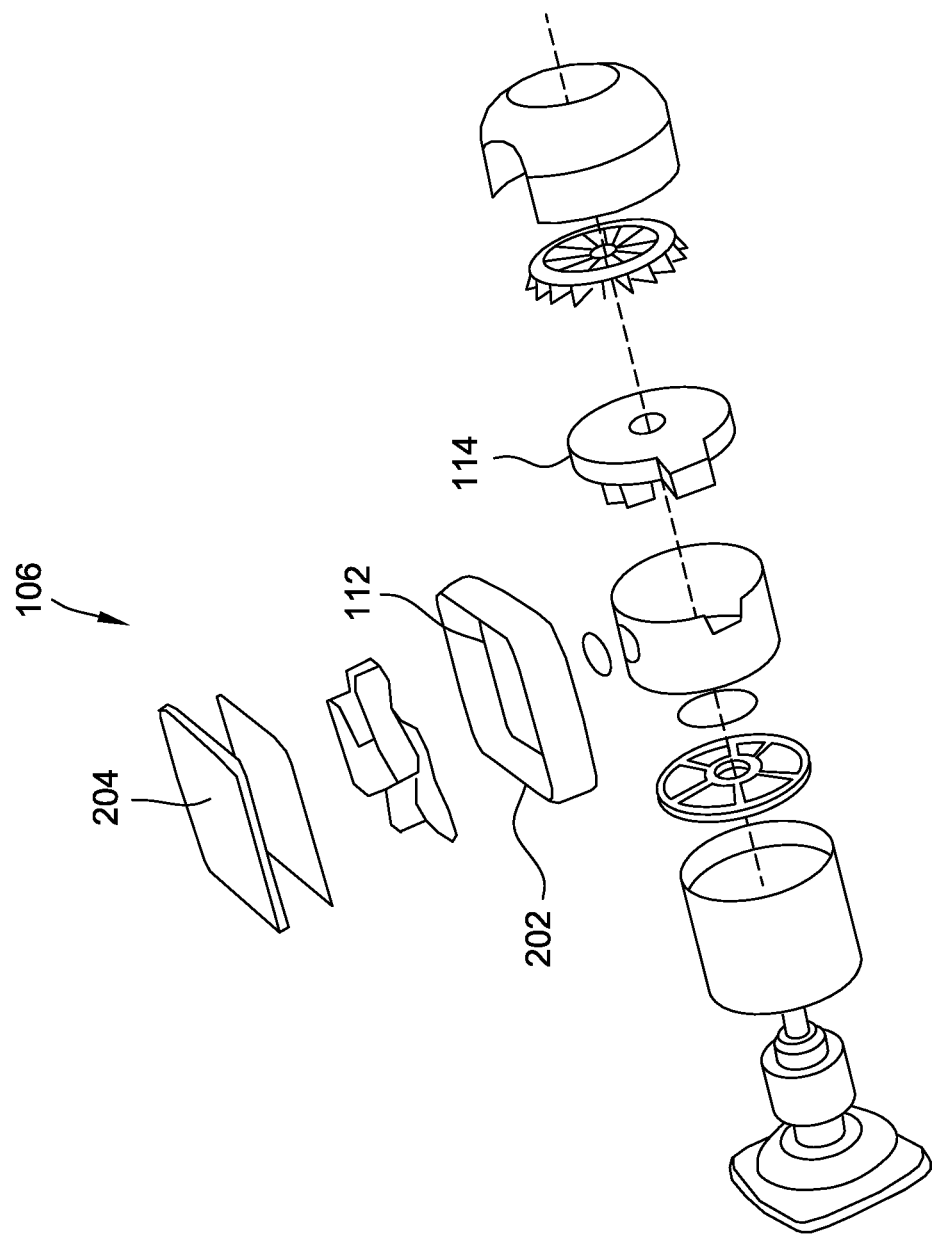
FIG. 2 is an exploded view of an example embodiment of the motor of the pump system shown in FIG. 1.
Figure 3:
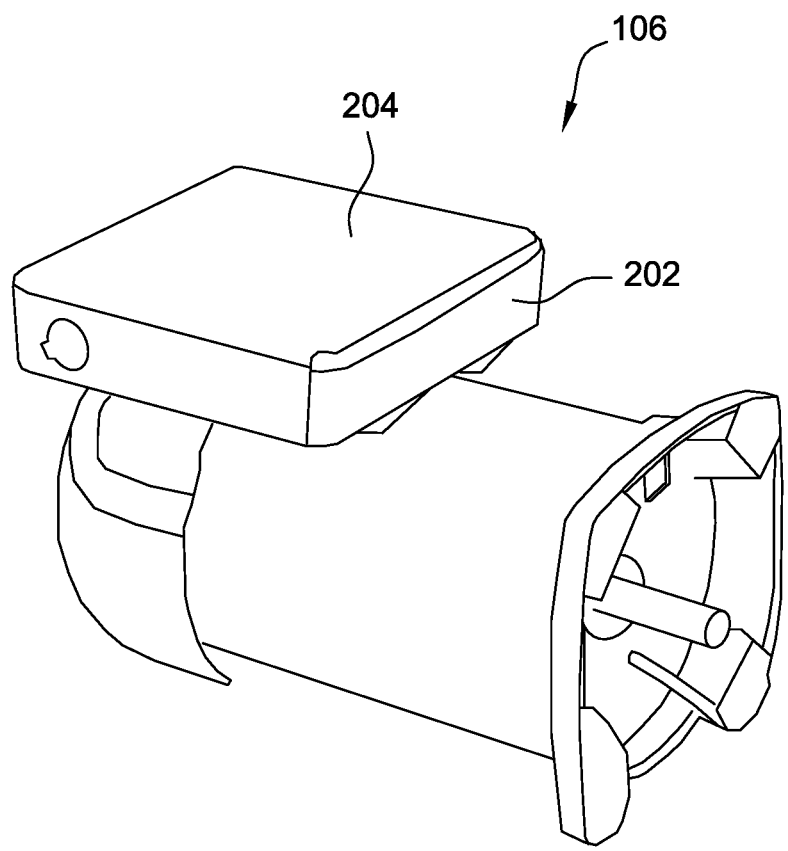
FIG. 3 is a perspective view of an example embodiment of the motor shown in FIGS. 1-2.

FIG. 2 is an exploded view of an example embodiment of motor 106 (as shown in FIG. 1). FIG. 3 is a perspective view of the example embodiment of motor 106 (shown in FIGS. 1 and 2).

Accordingly, as best shown with combined reference to FIG. 2 and FIG. 3, motor 106 includes first control board 112 and second control board 114, as described herein. In the example embodiment, first control board 112 may be enclosed or contained within a top box 202, which may reside outside motor housing 101, and which may mechanically couple to exterior surface 105 of housing 101 to form a portion of motor 106 assembly. Top box 202 may be sealed, such as by gaskets, fasteners, and the like, to form a liquid tight seal around first control board 112. In addition, in at least some embodiments, top box 202 may include a window 204 that is permeable or semi-permeable to electromagnetic radiation. Specifically, window 204 may allow a suitable wireless signal to enter within top box 202 for reception by first control board 112, as described herein. As such, window 204 may be permeable or semi-permeable to any BLUETOOTH, WiFi, NFC, RF, and/or any narrow band IOT signal, such as any wireless 5G signal, as well as any 3G and/or 4G signal.

Figure 4:
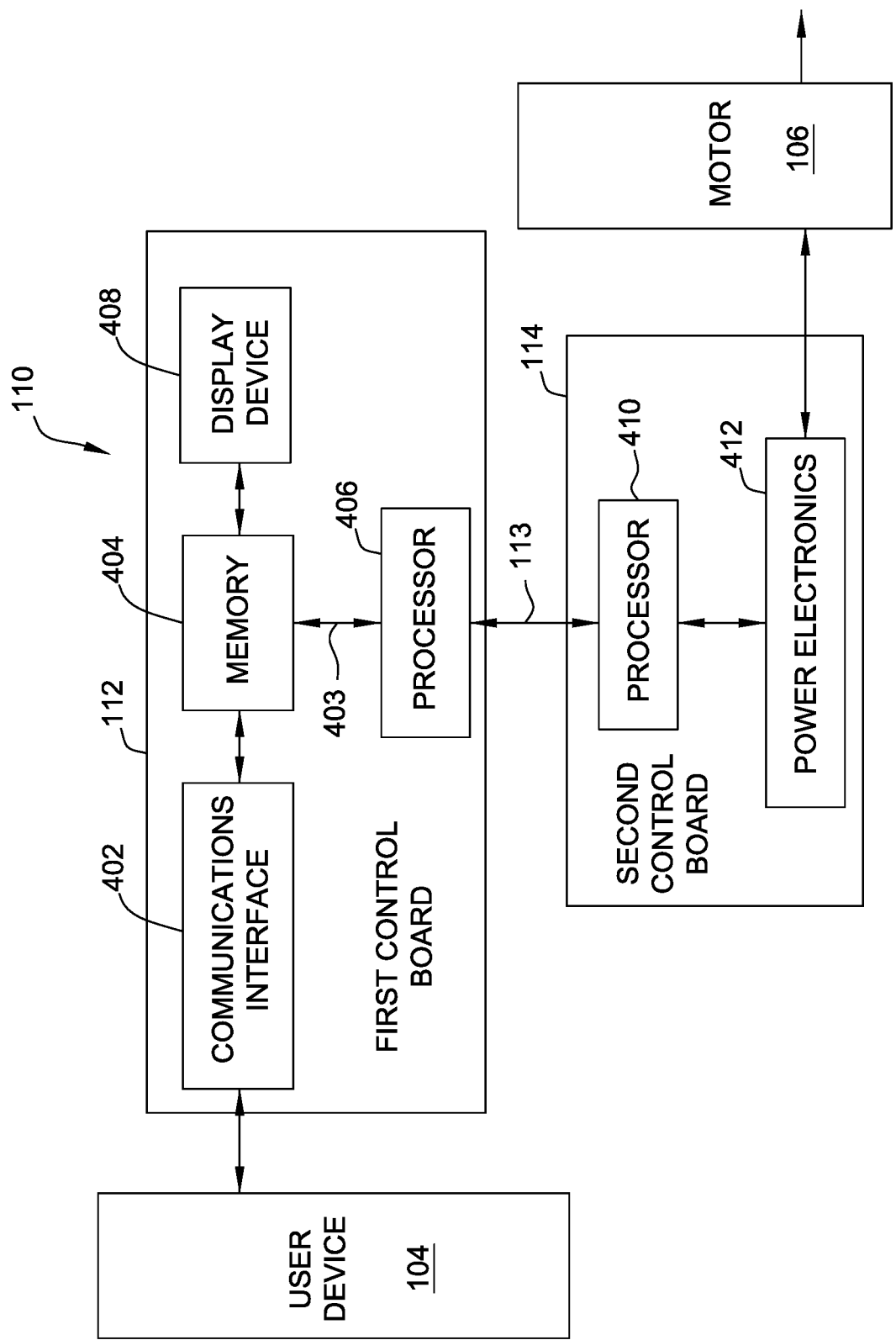
FIG. 4 is a block diagram illustrating an example embodiment of the first control board and the second control board shown in FIGS. 1-3.

FIG. 4 is a block diagram illustrating an example embodiment of first control board 112 and second control board 114 (shown in FIG. 1). As shown, first control board 112 may include a communication interface 402, a memory device 404, a controller or processor 406, and/or a display device 408, each of which may be communicatively coupled or interconnected, as desired, by a system bus 403. In various embodiments, communication interface 402 may include any suitable wireless communication interface, such as a transceiver configured for BLUETOOTH, WiFi, NFC, and/or RF communications. Display device 408 may be embodied in any of a variety of suitable implementations, such as, but not limited to, as a liquid crystal display device (LCD), a membrane display device, any touchscreen display device, such as a capacitive touchscreen display device, and/or any other suitable display device. In some embodiments, display device 408 includes or displays touchscreen options (e.g., touchscreen "buttons") for controlling motor 106 and/or pump 108.

Second control board 114 includes a processor 410 and a power electronics module 412, which may be electrically and/or communicatively coupled, as desired. In the example implementation, power electronics module 412 includes an AC-DC converter (e.g., a forward converter, or rectifier), a DC-AC converter (e.g., a power inverter), and the like. In addition, although not shown, second control board 114 may include a communication interface that communicates directly (or via a wireless network) with user device 104. Specifically, although in the example implementation, first control board 112 handles communication with user device 104, in at least one embodiment, second control board 114 may alternatively or additionally communicate with user device 104.

Control system 110 may, as described herein, be disposed, at least partially within housing 101 of motor 106. For example, second control board 114 may be disposed within interior region 103 of housing 101. Stated another way, in at least some embodiments, second control board 114 may be sealed within housing 101 to prevent, or reduce, contact between a liquid (e.g., water) outside motor 106 and second control board 114. As a result, second control board 114, which may perform certain system-level commands as well as control pump 108, may be contained within housing 101 to protect second control board 114, which may, in turn, result in a more damage-resistant, robust construction of motor 106.

In the example embodiment, at least a portion of first control board 112 may be disposed within top box 202, as described above, and/or coupled on external surface 105 of housing 101, such that top box 202 is accessible from outside housing 101. In addition, in at least some embodiments, display device 408 of first control board 112 (if it is included) may be disposed and/or accessible from external surface 105 of housing 101 to enable user interaction with display device 408. More particularly, display device 408 may be accessible by a user outside housing 101 to facilitate receiving user input commands, displaying status and other media output to the user, and the like. However, in at least some embodiments, first control board 112 excludes display device 408.

Accordingly, it can be seen that first control board 112 and second control board 114 may, in at least some embodiments, be physically distinct components and/or physically partitioned, such that at least a portion of first control board 112 may reside outside housing 101 for accessibility by a user. Although control boards 112 and 114 may be physically separated, as described herein, in the example embodiment, first control board 112 is electrically and/or communicatively coupled to second control board 114, such as by way of a system or control bus 113. Likewise, in at least one embodiment, first control board 112 may wirelessly communicate with second control board 14, such as using any suitable wireless communication protocol (e.g., NFC, BLUETOOTH, WiFi, and others, as described herein).

In addition to these features, and as a result of separating first control board 112 from second control board 114, in some embodiments, first control board 112 can be replaced, or swapped (e.g., if first control board 112 is damaged or an upgrade or retrofit is desired), with a replacement control board without removal of second control board 114. Specifically, in at least some embodiments, second control board 114 may be arranged for "plug and play" or similar functionality with first control board 112, whereby removal of first control board 112 is accomplished simply by disconnecting first control board 112 from second control board and reconnecting a replacement control board to second control board 114.

Moreover, in at least some embodiments, second control board 114 may also store instructions for safety and/or control of motor 106. For example, in addition to instructions for performing system-level commands described above, safety and control instructions may be included in firmware stored on second control board 114. As a result, in at least some embodiments, at least some of the instructions stored on second control board 114 may be subject to regulation and/or certification requirements. Accordingly, as described elsewhere herein, at least one advantage of physically separating first control board 112 from second control board 114 is that replacement of first control board 112 may not require recertification of second control board 114 and/or motor 106 as a whole. Rather, first control board 112 may be swapped or replaced, as described, without any recertification or re-inspection requirement. In addition, because second control board 114 may, in the example embodiment, store all safety instructions in firmware, malfunctioning, damage, or loss of first control board 112 may not impact safe operation of motor 106.

In operation, a user may interact with a graphical user interface provided on user device 104 to control operation of motor 106 and/or pump 108. For example, the user may specify a motor speed, on and off times, and the like, via user device 104. Similarly, user device 104 may display any suitable operating information related to motor 106 and/or pump 108, such as pump speed, on and off times, filter life, chemical analysis, motor temperature, and the like.

In response to receiving user input, user device 104 may transmit the user input to control system 110 of motor 106, such as via any BLUETOOTH, WiFi, NFC, RF, or other wireless protocol (e.g., narrow band IOT, 5G, etc.) More particularly, a transceiver of user device 104 may wirelessly communicate with communication interface 402 of first control board 112 to provide the user input to first control board 112. Control board 112 may process the user input, such as by executing instructions on processor 206 stored in memory 204, to provide one or more control instructions to second control board 114 for controlling operation of motor 106 (e.g., adjusting motor speed, on and off times, etc.)

For example, as described above, processor 406 may convert or translate user input into system-level commands for execution by second control board 114, such as "go" or activation commands, "stop" or deactivation commands, status commands, and the like. Likewise, processor 410 of second control board 114 may perform and/or facilitate system-level processing, such as receiving commands from first control board 112, providing control signals to pump 108 in response to receiving commands from first control board 112, performing safety and status checks, and the like. Similarly, first control board 112 may control display device 408 to display adjusted settings, various media output, and the like.

Accordingly, motor 106 and pump 108 can, in the example embodiment, be controlled by a user via user device 104 without interaction by the user with display device 408 on motor 106 itself. Similarly, in at least some embodiments, no display device 408 is included, such that user device 104 is substituted for any display device physically integrated with or coupled to motor 106.

Figure 5:
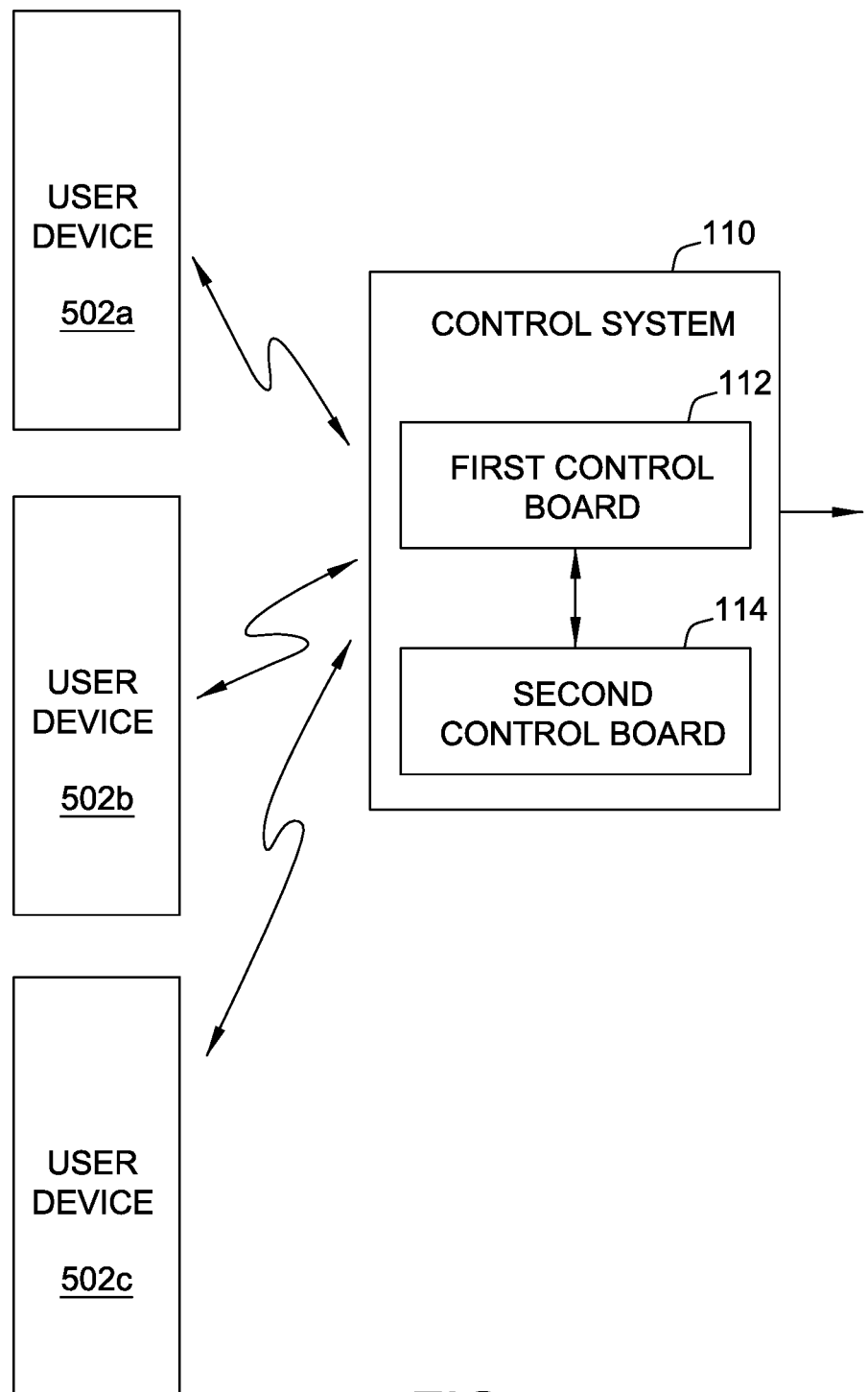
FIG. 5 is a block diagram illustrating an example embodiment of the first control board shown in FIGS. 1-4, in which the first control board is communicatively coupled to a plurality of user devices.

FIG. 5 is a block diagram illustrating an example embodiment of first control board 112 (shown in FIG. 1 and FIG. 2), in which first control board 112 is communicatively coupled to a plurality of user devices 502a-c. Accordingly, in this example embodiment, as shown, control system 110 may receive user input from any of a variety of user devices 504a-c, such as any user device 504a-c that has been "paired" via BLUETOOTH and/or otherwise authorized to communicate with and control motor 106 and/or pump 108. In one example, a plurality of pool technicians may be registered or authorized on their respective user devices 504a-c to control operation of motor 106 and/or pump 108, which may facilitate operation of a large pool system maintained by a variety of technicians. Likewise, several family members may utilize the features shown in FIG. 5 to control operations of a family swimming pool or spa.

Figure 6:
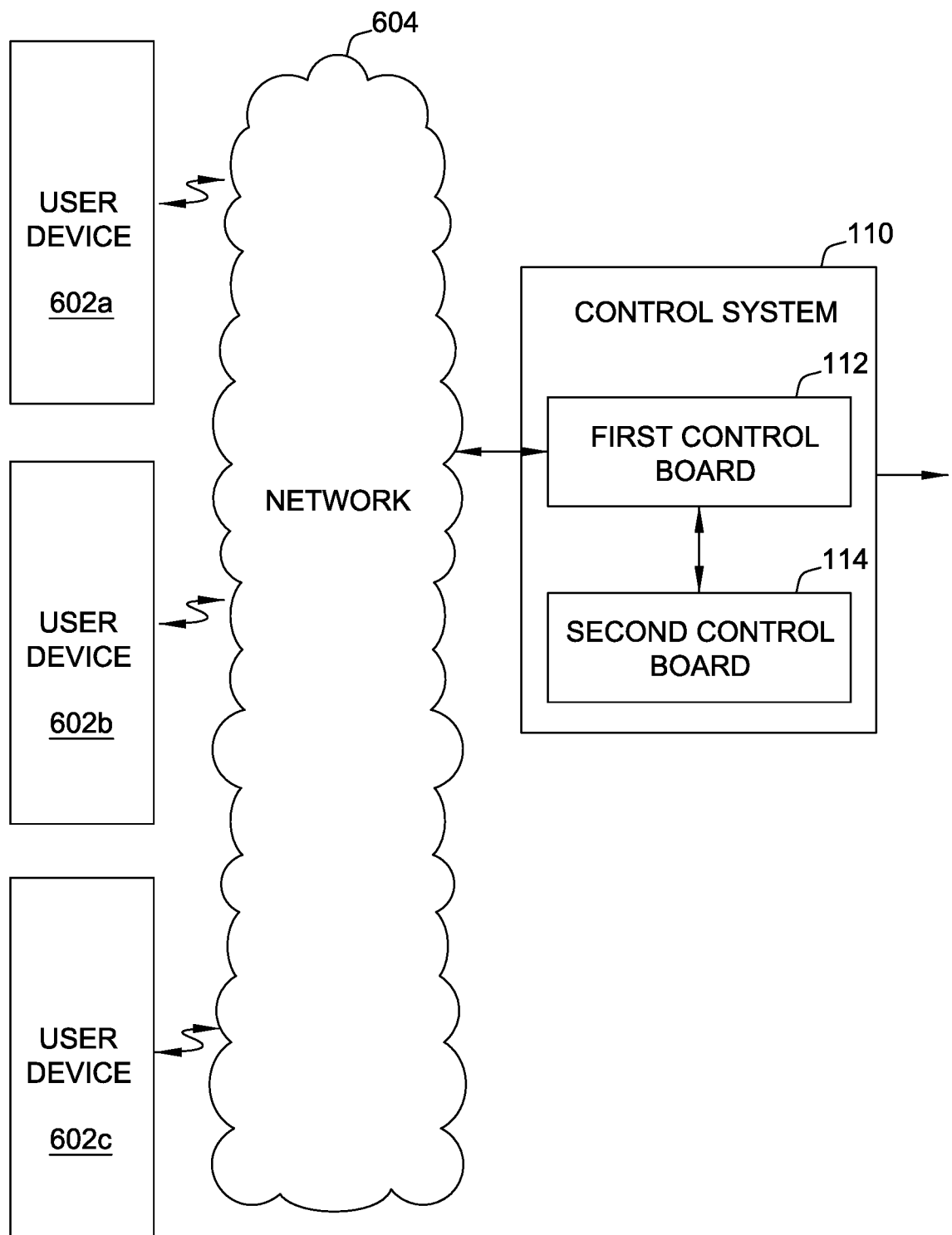
FIG. 6 is a block diagram illustrating an example embodiment of the first control board shown in FIGS. 1-4, in which the first control board is communicatively coupled to a plurality of user devices via a communication network.

FIG. 6 is a block diagram illustrating an example embodiment of first control board 112 (shown in FIG. 1 and FIG. 2), in which first control board 112 is communicatively coupled to a plurality of user devices 602a-c via a communication network 604. The example embodiment shown in FIG. 6 is substantially the same as the embodiment depicted with reference to FIG. 5, except, as shown, that user devices 602a-c may not communicate directly with control system 110. Rather, in this embodiment, user devices 602a-c may communicate with control system 110 (e.g., first control board 112) via network 604, which may include a local area network (LAN), a wide area network (WAN), the internet, a virtual private network (VPN), a cloud computing network, such as a fog or edge network, a narrow band IOT network (e.g., a 5G network), and/or any other suitable intermediate communication network that relays communications between user devices 602a-c and control system 110.

Figure 7:
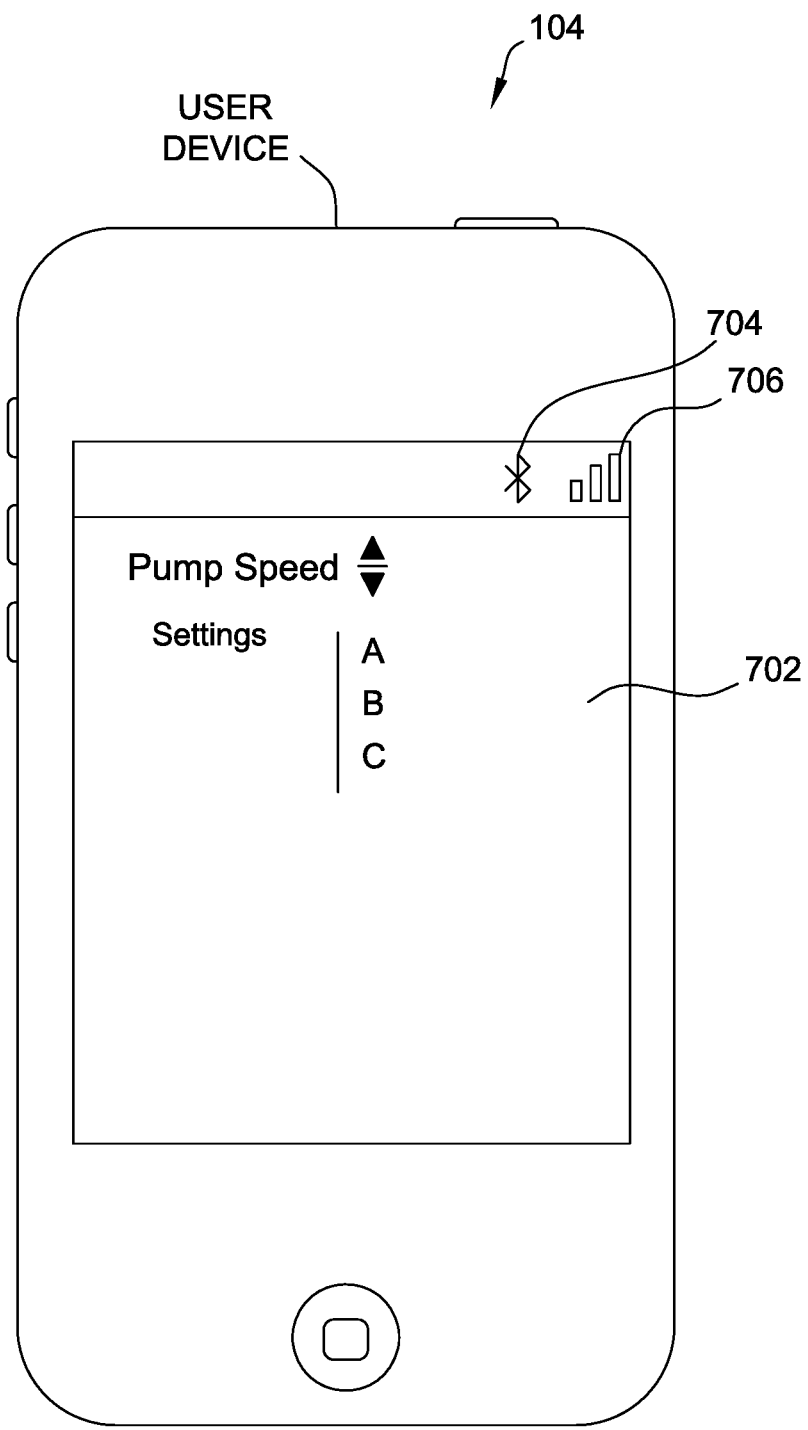
FIG. 7 is a front perspective view of an example embodiment of a user device, such as a smartphone, which may be communicatively coupled with the control system shown in FIGS. 1-6

FIG. 7 is a front perspective view of an example embodiment of user device 104, such as a smartphone, which may be communicatively coupled with control system 110 (shown in FIG. 1 through FIG. 6). As shown, user device 104 may include a graphical user interface 702, which may display a variety of information, such as pump 108 and/or motor 106 speed, on and off times for motor 106 and/or pump 108, and/or a variety of other parameters, as described herein.

Further, as described herein, user device 104 may include a touchscreen interface, which may receive user input for controlling motor 106 and/or 108. In addition, user device 104 may include one or more icons or other indicia that show a wireless communication status of user device 104. For example, a first icon 704 may indicate a BLUETOOTH signal strength or status and/or whether user device 104 is connected via BLUETOOTH to control system 110. Similarly, a second icon 706 may provide an indication of an RF signal strength of status and/or whether user device 104 is connected via RF (e.g., via a telecommunications provider) to control system 110. In addition, one or more other icons may be provided in similar fashion, such as for indicating WiFi signal strength and/or connectivity status, an NFC signal strength and/or connectivity status, and/or any other wireless communication protocol signal strength and/or connectivity status.

Figure 8:
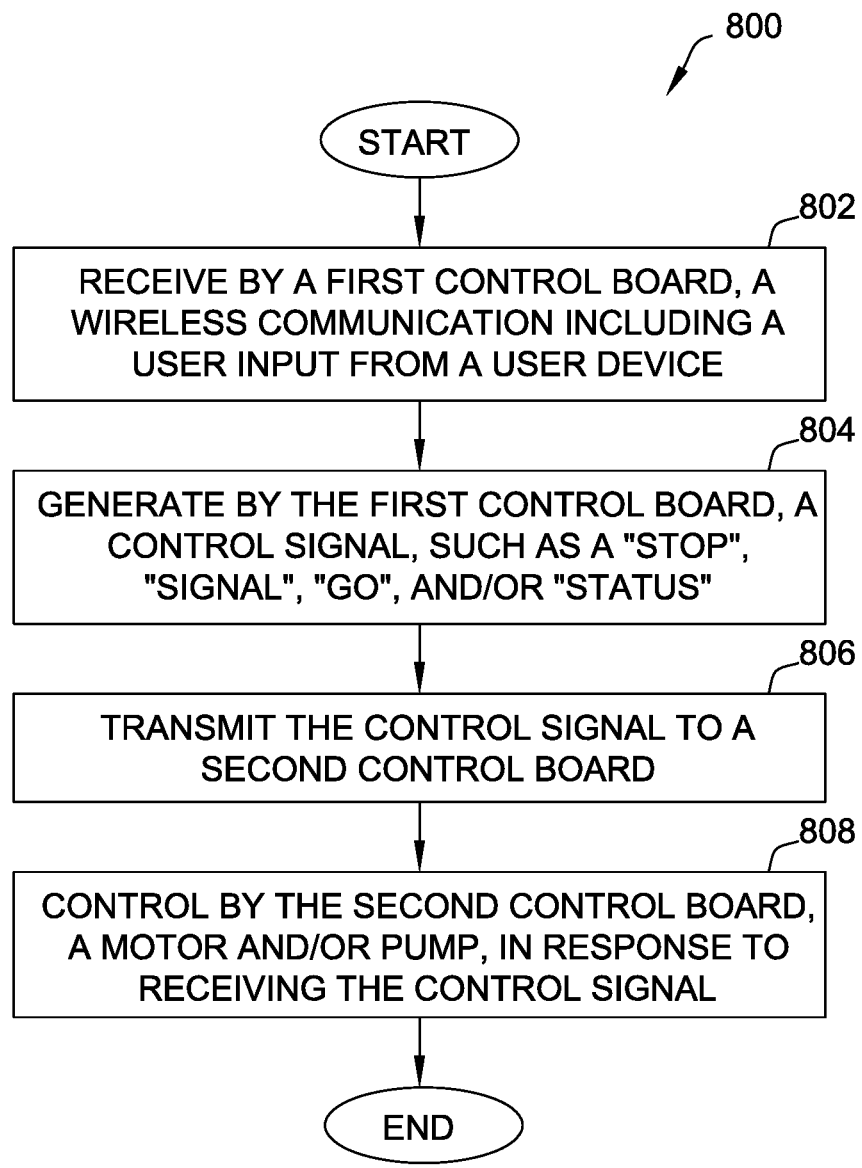
FIG. 8 is a flowchart illustrating an example embodiment of a process for controlling the pump motor using the control system shown in FIGS. 1-7

FIG. 8 is a flowchart illustrating an example embodiment of a process 800 for controlling motor 106 using control system 110 (shown and described in additional detail with reference to FIGS. 1-7). Accordingly, as shown, in the example embodiment, process 800 may include receiving, by first control board 112, a wireless communication including a user input from user device 104 (step 802). For example, communications interface 402 of first control board 112 may wirelessly communicate with user device 104 to receive the user input from user device 104, which may specify, for instance, a motor 106 and/or pump 108 setting. In addition, in response to receiving the user input, processor 406 of first control board 112 may generate a control signal, such as a "stop," "go," and/or "status" signal (step 804), which may be provided to and received by processor 410 of second control board 114 (step 806). Moreover, in response to receiving the control signal, processor 410 of second control board 114 may control motor 106, such as, for example, to adjust a speed of motor 106, on and/or off times of motor 106, and the like, depending upon the user input provided to control system 110 by the user via user device 104 (step 808). As a result, the user may interface with user device 104 to provide wireless control of motor 106 and/or pump 108, such as from a distance and/or without directly interfacing with any display device 408 of motor 106.

Embodiments of the pump system described herein thus include a control system separated into a first control board (e.g., an "application board") and a second control board (e.g., a "drive board"). In the example embodiment, the first control board is enclosed in a top box, which may be coupled to an exterior portion of the pump system, such as an exterior of a pump motor. The second control board may be contained within a motor housing and communicatively coupled via a wired and/or wireless connection to the first control board. In operation, the first control board can wirelessly communicate with a user device, such as a smartphone or tablet computing device, which a user may interface with to provide the user input. In the example embodiment, the first control board processes the user input to generate one or more system-level commands for controlling operation of the motor, such as "stop," "go," and/or "status" commands. Advantageously, the first control board may be replaced or swapped out of the control system without replacement of the second control board contained within the motor housing.

The systems and methods described herein may be implemented using computer programming or engineering techniques including computer software, firmware, hardware or any combination or subset thereof, wherein the technical effects and specific improvements to the technology and technical field may include one or more of: (a) providing a control system physically separated into a first control board and a second control board; (b) providing the first control board within a top box, which may be coupled to an exterior of the pump system, such as an exterior of a motor of the pump system; (c) providing the second control board within the motor housing for added security and protection of the second control board; (d) facilitating, by the first control board, wireless communication with a user device, where the user device may receive user input commands; (e) facilitating receiving the user input by the first control board from the user device; (f) wireless communication between the user device and the first control board in any of a variety of wireless communication protocols, such as BLUETOOTH, WiFi, RF, NFC, narrow band IOT, 5G, and/or any other wireless protocol; and (g) translation of the user input by the first control board to one or more system-level control signals for driving or controlling the pump, such as "go," "stop," and/or "status" commands.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc—read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for controlling a pump motor, said control system comprising;
   a first portion comprising a wireless communication interface and a first processor coupled in communication with said wireless communication interface, said first processor configured to:
      control said wireless communication interface to wirelessly receive a user input from a user device; and
      generate a control signal in response to receiving the user input; and
   a second portion sealed with a liquid tight seal inside a housing of the pump motor, said first portion disposed outside the liquid tight seal, said second portion comprising a second processor coupled in communication with said first processor, said second processor configured to:
      retrieve the control signal from said first processor; and
      control the pump motor in response to the control signal,
   wherein said first portion is configured to be removed from said control system without removal of said second portion, and
   wherein said second portion is configured to be communicatively coupled following removal of said first portion with a replacement portion.

2. The control system of claim 1, wherein said first processor is further configured to translate the user input received from the user device to at least one of i) an activation control signal, ii) a deactivation control signal, or iii) a status control signal.

3. The control system of claim 2, wherein said first processor is further configured to transmit the at least one of the i) the activation control signal, ii) the deactivation control signal, or iii) the status control signal to said second processor of said second portion.

4. The control system of claim 1, wherein said second processor is disposed proximal a heat sink of the pump motor.

5. The control system of claim 1, wherein said second portion further comprises a memory device that stores computer-executable instructions for controlling one or more safe operating parameters of the pump motor, and wherein said second portion is protected within the housing of the pump motor from contact with a liquid.

6. The control system of claim 1, wherein said wireless communication interface is at least one of: i) a BLUETOOTH communication device, or ii) a near field communication (NFC) device.

7. The control system of claim 1, wherein said wireless communication interface is a radio frequency (RF) communication device.

8. The control system of claim 1, wherein said first processor is further configured to at least control a display device of the pump motor to display at least one operating parameter of the pump motor.

9. The control system of claim 1, wherein the user input received by said first processor comprises a change to at least one operating parameter of the pump motor.

10. A pump motor system comprising:
    a pump motor;
    a housing defining an interior region; and
    a control system for controlling said pump motor, said control system comprising:
       a first control board comprising a wireless communication interface and a first processor coupled in communication with said wireless communication interface, said first processor configured to:
          control said wireless communication interface to wirelessly receive a user input from a user device; and
          generate a control signal in response to receiving the user input; and
       a second control board sealed with a liquid tight seal inside an interior region defined by the housing, said second control board contained together with said pump motor within the liquid tight seal inside the interior region, said first control board disposed outside the liquid tight seal, said second control board comprising a second processor coupled in communication with said first processor, said second processor configured to:
          retrieve the control signal from said first processor; and
          control the pump motor in response to the control signal,
       wherein said first control board is configured to be removed from said control system without removal of said second control board, and
       wherein said second control board is configured to be communicatively coupled following removal of said first control board with a replacement control board.

11. The pump motor system of claim 10, wherein said first processor is further configured to translate the user input received from the user device to at least one of i) an activation control signal, ii) a deactivation control signal, or iii) a status control signal.

12. The pump motor system of claim 11, wherein said first processor is further configured to transmit the at least one of the i) the activation control signal, ii) the deactivation control signal, or iii) the status control signal to said second processor of said second control board.

13. The pump motor system of claim 10, wherein said second processor is disposed proximally a heat sink of said pump motor.

14. The pump motor system of claim 10, wherein said wireless communication interface is at least one of: i) a BLUETOOTH communication device, or ii) a near field communication (NFC) device.

15. The pump motor system of claim 10, wherein said wireless communication interface is a radio frequency (RF) communication device.

16. The pump motor system of claim 10, wherein said first processor is further configured to control a display device of said pump motor to display at least one operating parameter of said pump motor.

17. A method for controlling a pump motor, said method comprising:
- receiving wirelessly, by a wireless communication interface of a first control board of a control system, a wireless communication from a user device, wherein the wireless communication includes a user input;
- generating, by the first control board of the control system, a control signal in response to receiving the user input;
- receiving, by a second control board of the control system, the control signal from the first control board, the second control board sealed with a liquid tight seal inside an interior region defined by a housing of the pump motor, the second control board contained together with the pump motor within the liquid tight seal inside the interior region, the first control board disposed outside the liquid tight seal; and
- controlling, by the control system, the pump motor in response to the control signal,
- wherein the first control board is configured to be removed from the control system without removal of the second control board and
- wherein the second control board is configured to be communicatively coupled following removal of the first control board with a replacement control board.

* * * * *